Patented Dec. 18, 1928.

1,695,812

UNITED STATES PATENT OFFICE.

JOHN WESLEY MARDEN, OF EAST ORANGE, AND HENRY KNEELAND RICHARDSON, OF NEWARK, NEW JERSEY, ASSIGNORS TO WESTINGHOUSE LAMP COMPANY, A CORPORATION OF PENNSYLVANIA.

REFRACTORY CEMENT.

No Drawing. Application filed June 25, 1923. Serial No. 647,744.

This invention pertains to a cement and more particularly to the production of a highly refractory cement for furnace or crucible lining or binding.

An object of the invention is to provide a cement for use under high temperature conditions, which will not interact with metals or alloys being treated to such high temperatures and which will not crack or disintegrate during use.

Another object is to provide a refractory cement that may be readily manipulated and applied in any desired thickness of coating or binding to less refractory material for furnace or crucible lining.

A further object is to provide a cement of the character specified that may be readily manufactured, transported and stored for an indefinite period in a commercially adaptable form.

Further objects will appear from a perusal of the following description and from the claims appended.

With the invention herein disclosed difficulties, heretofore encountered with cements for highly refractory work, such as decomposition of the cement, slagging, and interaction with the articles or material being fired or treated at high temperatures, are for practically all purposes avoided.

It is highly desirable in high temperature furnace construction, that the lining or the binding be composed of a refractory material that will not interact with the substance being heated therein. Materials particularly adapted for this purpose are the refractory oxides of thorium and zirconium.

Heretofore, in the manufacture of refractory compositions, it has been proposed to use a colloidal solution for holding the refactory material in suspension. It has been found, however, that the usual colloids are not capable of satisfactorily suspending the very heavy oxides, as thorium oxide.

In accordance with the present invention, a dry commercially ready mixed cement is produced by mixing the refractory oxide, such as thorium and zirconium oxide with a suspending medium which when mixed with water or other liquid, will form a heavy viscous liquid mass suitable for suspending the refractory oxide but which does not go into colloidal solution. A satisfactory suspending medium for this purpose has been found to be a finely pulverized double halide salt such as cryolite or the like.

The refractory oxide and the binder salt may be mixed in dry form so that when it is desired to use the cement, it will only be necessary to add water or possibly an acid and water to the powdered mixture to produce a cement of any desired consistency. The function of the acid is to cause any colloidal particles present to coagulate.

However a salt such as ammonium or sodium phosphate may be originally incorporated in the dry cement to give an electrolytic action upon the addition of the water to cause the colloids present to coagulate.

More particularly stated, the cement may be made by thoroughly pulverizing thoria, zirconia or other highly refractory oxides to pass a 200 mesh sieve, and adding thereto a sufficient quantity of cryolite, dried and powdered clay, or the like, to form, on treatment with water, a thick paste capable of completely suspending all thoria present.

In our copending application now issued which was filed June 23, 1922, entitled "Composite refractory body" (Serial No. 570,479, U. S. Patent 1,554,225) and which is assigned to the Westinghouse Lamp Company, we have described a composition adapted for the production of refractory brick. The composition may also be manufactured in a dry state as a commercial refractory cement. For this purpose, a mixture consisting of approximately nine parts of thoria, which has been previously ignited at about 1300° C., about one part of zircona, about one part of a double halide salt, such, for example, as potassium-thorium fluoride, cryolite, or the like, and perhaps a salt capable of developing electrolytic action in the presence of water, is thoroughly ground and passed through a 200 mesh screen, whereupon it is in condition for commercial distribution.

We may use a mixture of thoria and ground thoria ware that has been previously ignited at high temperatures, together with powdered clay, or cryolite, or, for certain kinds of work where carbon is unobjectionable, ten parts of crushed crucibles or brick, one part of a hot tar and perhaps two parts of very finely divided thoria, which has been ball-milled for a long time, makes a very excellent cement. In this latter case, the tar is preferably added when the refractory mixture is to be used. In any desirable combination, however, the thoria should have been previously ignited to a very high temperature in order to reduce its shrinkage, as otherwise, the cementing material may crack and be unsatisfactory on application. Shrinkage may be considerably overcome by fusing the thoria with borax.

The cement, as made in accordance with the above specification, may be mixed and applied as any ordinary cement or mortar is mixed and applied and is adapted for pointing bricks, etc., as well as for coating and binding.

What is claimed is:

1. A composition of matter comprising thoria, a double halide salt adapted to act as a binder and suspender of said thoria upon the addition of a liquid and a dry ingredient adapted to precipitate any colloids present in the composition and cause them to coagulate.

2. A cement powder comprising a rare metal compound and a double halide salt adapted to function similarly to a colloid upon the addition of a liquid to retain the rare metal compound in suspension.

3. A cement powder comprising thorium oxide, a double halide salt, adapted to act as a suspending medium therefor, in the presence of a liquid and sodium or ammonium-phosphate adapted to precipitate any colloids present in said compound and permit them to coagulate.

4. A cement powder comprising approximately 9 parts of thorium oxide, 1 part of cryolite adapted to sustain the thorium oxide in the presence of water and a small amount of sodium or ammonium phosphate adapted to cause any colloids present to precipitate.

In testimony whereof, we have hereunto subscribed our names this 23rd day of June, 1923.

JOHN WESLEY MARDEN.
HENRY KNEELAND RICHARDSON.